Jan. 16, 1934.     H. J. WINTER     1,943,574
FLUID PRESSURE BRAKE
Filed Aug. 2, 1928

INVENTOR
HARRY J. WINTER
BY *Wm. H. Cady*
ATTORNEY

Patented Jan. 16, 1934

1,943,574

UNITED STATES PATENT OFFICE 1,943,574

FLUID PRESSURE BRAKE

Harry J. Winter, London, England, assignor to The Westinghouse Air Brake Company, Wilmerding, Pa., a corporation of Pennsylvania Application August 2, 1928, Serial No. 296,919, and in Great Britain August 27, 1927

7 Claims. (Cl. 303—4)

This invention relates to fluid pressure braking apparatus of the kind in which braking equipment of two different types are provided on all or certain of the vehicles of a train, the locomotive brakes for instance being of the vacuum operated type and the brakes on the remaining vehicles being arranged to be operated by compressed air.

The invention has for its object to provide improved arrangements whereby the control of the two types of braking equipment may be rendered dependent upon one another so that for instance the application of the compressed air brakes on the vehicles of the train may automatically cause an application of the vacuum brakes on the locomotive by the admission of atmospheric air to the vacuum train pipe, the degree of application of the brakes in the case of the two equipments being proportional to one another.

According to the principal feature of the invention the improved apparatus comprises a valve for controlling the admission of atmospheric air to the vacuum train pipe, this valve being automatically controlled by the combined action of the pressure in the compressed air train pipe, the pressure obtaining in the vacuum train pipe and a substantially constant pressure such as the normal compressed air train pipe pressure or the pressure of a spring or springs, in such a manner that an application of the compressed air brakes effected by causing a reduction in the pressure in the compressed air train pipe causes a corresponding rise of pressure in the vacuum train pipe up to a predetermined maximum limit dependent upon the adjustment of the spring above referred to. The spring or springs may be replaced or assisted by the action of fluid under pressure preferably obtained from the compressed air train pipe which will hereinafter be termed the automatic train pipe.

Figure 1:
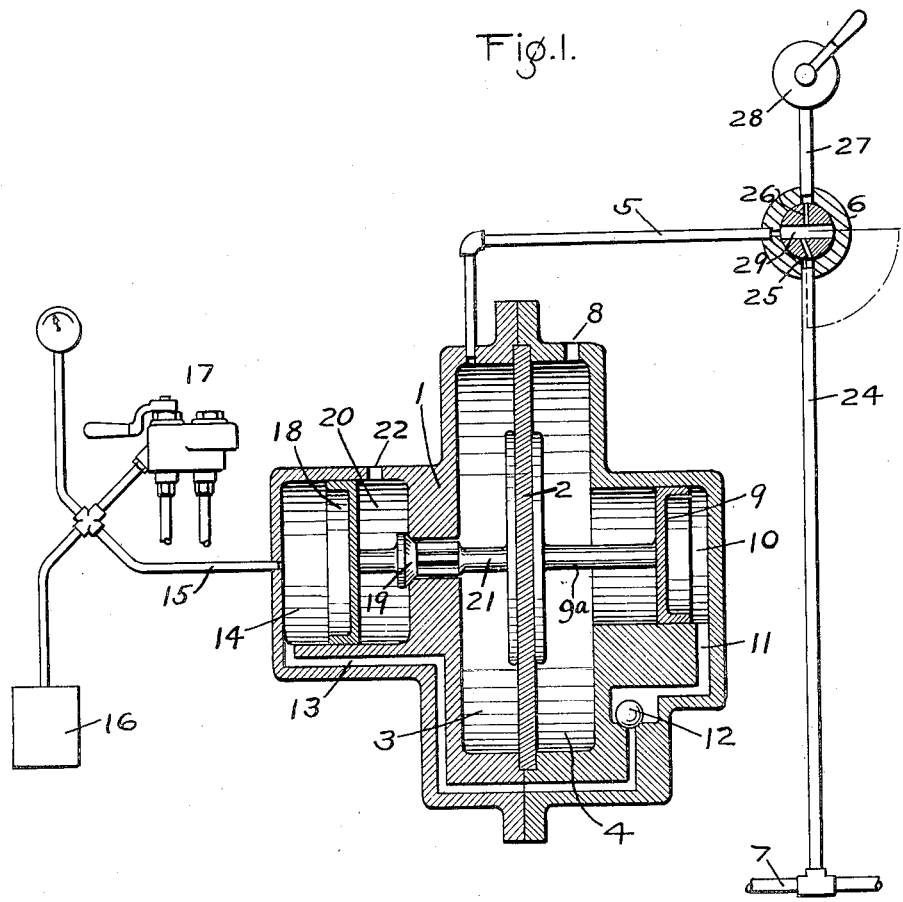
Figure 2:
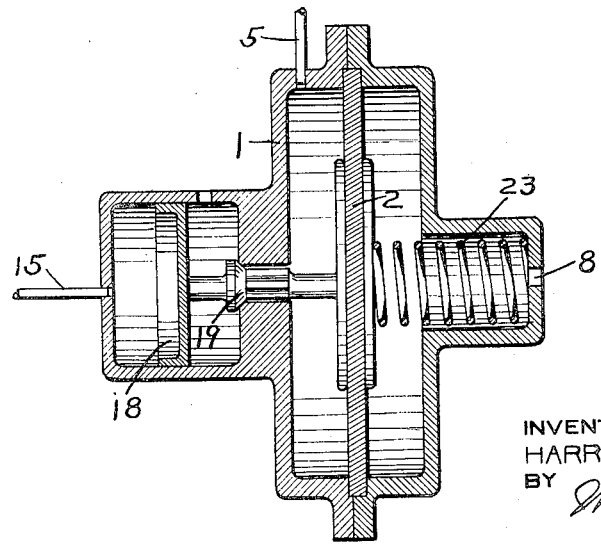

The invention is illustrated by way of example in the accompanying drawing; Figure 1 of which is a somewhat diagrammatic view of a portion of a fluid pressure braking apparatus embodying a control valve constructed in accordance with one form of the invention; Figure 2 illustrating a modified form of this valve.

Referring now first to the apparatus shown in Figure 1, it will be seen that a control valve is provided comprising a suitable casing 1 within which is contained a flexible diaphragm 2 separating the casing into two chambers 3, 4 respectively, the chamber 3 on the left face of the diaphragm 2 being in communication through a pipe 5 and a cock 6 with the vacuum train pipe 7. The chamber 4 on the right face of the diaphragm 2 is in communication with the atmosphere through a port 8 in the wall of the casing 1 and is divided into two compartments by a piston 9 connected to the diaphragm 2 by a suitable stem 9$^a$.

The inner face of the piston 9 is subject to the same pressure as the right face of the diaphragm 2 viz, atmospheric pressure, and the chamber 10 on the outer side of the piston 9 is subject to the action of fluid under pressure supplied to the chamber 10 through a passage 11 containing a non-return valve 12 and communicating with a passage 13 leading to a chamber 14 in the left-hand portion of the casing 1.

The chamber 14 is in communication through a pipe 15 with the equalizing reservoir 16 of the engineer's brake valve 17 of the braking apparatus and the chamber 10 is thus supplied with fluid at the pressure normally obtaining in the automatic train pipe of the apparatus when the brakes are released. The chamber 3 on the left of the diaphragm 2 is adapted to be placed in communication with an additional chamber 20 in the casing 1 through a suitable valve 19 mounted on a stem 21 attached at its right hand extremity to the diaphragm 2 and at its left hand extremity to a piston 18 separating the chamber 20 from the chamber 14. The left-hand face of the piston 18 is thus subject to the pressure in the automatic train pipe or equalizing reservoir 16 and its right-hand face to atmospheric pressure through a port 22 in the wall of the casing 1.

The areas of the two pistons 9 and 18 and of the diaphragm 2 are so chosen that with the normal automatic train pipe pressure in the chambers 10 and 14 acting on the outer faces of the pistons 9 and 18 respectively and the normal vacuum in the chamber 3 acting on the left-hand face of the diaphragm 2 the pistons and diaphragm are maintained in their right-hand position, shown in Figure 1, so as to close the valve 19 controlling communication between the vacuum train pipe 7 and the atmosphere through the chamber 3 on the left face of the diaphragm and the chamber 20 on the right face of the piston 18.

When the pressure in the automatic train pipe or equalizing reservoir 16 is reduced in order to effect an application of the brakes the pressure in the chamber 14 on the outer face of the piston 18 is reduced with the result that the diaphragm 2 and both of the pistons 9 and 18 move towards the left and open the valve 19 controlling communication between the chamber 3 and chamber 20 so that atmospheric air is admitted through the port 22 and chambers 20 and 3 to the vacuum train pipe 7 until the pressure in the train pipe attains a value sufficient to move the diaphragm 2 again towards the right against the action of the fluid pressure in the chamber 10 on the piston 9 so as to cut off the supply of atmospheric air to the vacuum train pipe. For every pressure in the automatic train pipe there is, therefore, a corresponding pressure in the vacuum train pipe which will cause the valve 19 controlling communication between the atmosphere and the vacuum train pipe 7 to close.

In the modified construction of control valve illustrated in Figure 2, the right-hand piston 9 and the chamber 10 are replaced by a spring 23 arranged to act on the right face of the diaphragm 2. The right-hand piston 9 may, however, if desired be retained and may be subject to the pressure of a spring such as 23 acting on its outer face in addition to fluid pressure, the area of the piston 9 being correspondingly reduced, such an arrangement enabling the control valve device to be adjusted for any standard pressure employed in the automatic train pipe.

When employing a control valve device of the kind above described, the vacuum train pipe 7 as shown in Figure 1 is preferably connected to the chamber 3 on the left face of the diaphragm 2 through a suitable cock 6 and when a locomotive provided with vacuum braking equipment is coupled to vehicles provided with braking apparatus of the compressed air type the cock 6 is adapted to be set in such a position as to connect the vacuum train pipe 7 to the control valve device through passages 25, 29 and through a small passage 26 to a pipe 27 leading to the ejector device 28 of the vacuum braking apparatus, thus enabling the ejector handle to be left in its running position. When, however, the locomotive is coupled to vehicles provided with vacuum braking apparatus the cock 6 may be set into such a position that the controlling device is cut off from the vacuum brake pipe 7 which is connected through the larger passage 29 in the cock 6 to the ejector device 28.

It will be observed from the above description of the improved controlling valve device that upon effecting a reduction in pressure in the automatic train pipe a corresponding rise in pressure is always obtained in the vacuum train pipe so that the brakes may always be applied on the locomotive whatever the reduction in automatic train pipe pressure down to a predetermined limit, with a force proportional to that with which the brakes are applied on the vehicles coupled to the locomotive and provided with braking apparatus of the compressed air type.

It will be evident that the invention is not limited to the particular construction and arrangements of parts above described and illustrated which may be varied as desired to suit particular requirements without exceeding the scope of the invention.

Having now described my invention, what I claim as new and desire to secure by Letters Patent, is:—

1. In a fluid brake equipment, the combination with a fluid pressure train pipe and a vacuum train pipe, of an equalizing reservoir, a brake valve device for venting fluid from said reservoir to effect a reduction in pressure in the fluid pressure train pipe and a valve device subject to the pressure in said reservoir and operated upon a reduction in pressure in said reservoir for supplying fluid to the vacuum train pipe.

2. In a fluid brake equipment, the combination with a fluid pressure train pipe and a vacuum train pipe, of means for effecting a reduction in pressure in the fluid pressure train pipe and a valve device comprising an abutment subject on one side to the pressure in the vacuum train pipe and on the other side to a constant pressure, a second abutment subject to the pressure in the fluid pressure train pipe, and a valve operated by said abutment for controlling the admission of fluid to the vacuum train pipe, the effective areas of said abutments being so proportioned that the valve is maintained closed so long as the pressure in the fluid pressure train pipe relative to its normal value corresponds to the pressure in the vacuum train pipe relative to the normal pressure in the latter train pipe.

3. In a fluid brake equipment, the combination with a fluid pressure train pipe and a vacuum train pipe, of means for effecting a reduction in pressure in the fluid pressure train pipe and a valve device comprising an abutment subject on one side to the presure in the vacuum train pipe and on the other side to a constant pressure, a second abutment subject to the pressure in the fluid pressure train pipe, and a valve operated by said abutment for controlling the admission of fluid to the vacuum train pipe, the effective areas of said abutments being so proportioned that the valve is opened upon a reduction in pressure below normal pressure in the fluid pressure train pipe and is closed when the pressure in the vacuum brake pipe is increased above normal to a predetermined value in relation to the reduced fluid pressure train pipe pressure.

4. In a fluid brake equipment, the combination with a fluid pressure train pipe and a vacuum train pipe, of means for effecting a reduction in pressure in the fluid pressure train pipe, and a valve device subject to the fluid pressure in both train pipes and operated upon a reduction in pressure in the fluid pressure train pipe for supplying fluid to the vacuum train pipe for increasing the fluid pressure therein and operated upon an increase in pressure in the vacuum train pipe to cut off the said supply of fluid to the vacuum train pipe.

5. In a fluid brake equipment, the combination with a fluid pressure train pipe and a vacuum train pipe, of means for effecting a reduction in pressure in the fluid pressure train pipe, and a valve device subject to the fluid pressure in both train pipes and operated upon a reduction in pressure in the fluid pressure train pipe for supplying fluid to the vacuum train pipe for increasing the fluid pressure therein and operated upon an increase in pressure in the vacuum train pipe to cut off the said supply of fluid to the vacuum train pipe when the pressure in the vacuum pipe attains a predetermined value with relation to the pressure in the fluid pressure train pipe.

6. In a fluid brake equipment, the combination with a fluid pressure train pipe and a vacuum train pipe, of means for effecting a reduction in pressure in the fluid pressure train pipe, and a valve device operatively subjected to the fluid pressure in both train pipes and operated to open position upon a reduction in pressure in the fluid pressure train pipe for supplying fluid to the vacuum train pipe for increasing the fluid pressure therein and operated to closed position for cutting off the said fluid supply when the pressure in the vacuum train pipe attains a predetermined value.

7. In a fluid brake equipment, the combination with a fluid pressure train pipe and a vacuum train pipe, of means for effecting a reduction in pressure in the fluid pressure train pipe, and a valve device operatively subjected on both sides respectively to fluid pressure in both train pipes and operable in response to relative variations in pressure thereon for effecting a variation in pressure in the vacuum train pipe that is proportional to the variation in the pressure in the fluid pressure train pipe.

HARRY J. WINTER.